US009211967B2

(12) United States Patent
Ungrady et al.

(10) Patent No.: US 9,211,967 B2
(45) Date of Patent: Dec. 15, 2015

(54) MOLDED PLASTIC CONTAINER WITH REDUCED NECK OVALITY

(75) Inventors: Eric B. Ungrady, Mt. Wolf, PA (US); Matthew A. Russell, Red Lion, PA (US); Hope Lee Townsend, Suwanee, GA (US); Michael L. James, Hamilton, OH (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 1008 days.

(21) Appl. No.: 13/246,967

(22) Filed: Sep. 28, 2011

(65) Prior Publication Data

US 2013/0075354 A1    Mar. 28, 2013

(51) Int. Cl.
*B65D 1/02* (2006.01)
(52) U.S. Cl.
CPC ........................ *B65D 1/023* (2013.01)
(58) Field of Classification Search
CPC ....................................................... B65D 1/023
USPC .......... 220/298, 300, 301, 302, 780; 215/201, 215/329, 356, 224, 317, 316, 337
See application file for complete search history.

(56) References Cited

U.S. PATENT DOCUMENTS

| 4,180,175 | A | * | 12/1979 | Virog et al. ................. 215/252 |
| 4,715,504 | A | * | 12/1987 | Chang et al. .................. 215/42 |
| 5,224,615 | A | * | 7/1993 | Hickerson ................... 215/218 |
| 5,447,766 | A | * | 9/1995 | Orimoto et al. ............ 428/36.91 |
| 5,511,677 | A | | 4/1996 | Oder |
| 5,938,054 | A | | 8/1999 | Loader |
| 5,979,681 | A | | 11/1999 | Varlet et al. |
| 7,891,510 | B2 | * | 2/2011 | Loughrin et al. ............. 215/252 |
| 2002/0011498 | A1 | | 1/2002 | Giblin et al. |
| 2002/0134747 | A1 | * | 9/2002 | Babcock et al. ............. 215/252 |
| 2006/0198974 | A1 | * | 9/2006 | Miller ......................... 428/35.7 |
| 2010/0270256 | A1 | * | 10/2010 | Penny ........................... 215/44 |

* cited by examiner

*Primary Examiner* — Robert J Hicks
*Assistant Examiner* — Kareen Thomas
(74) *Attorney, Agent, or Firm* — Baker Botts L.L.P.

(57) ABSTRACT

A plastic container has a main body portion, a neck portion and a molded feature such as an anti-rotation lug adjacent to the neck portion. The molded feature has a volume that is less than a volume that would be defined by the maximum external dimensions of the feature. This reduces the shrinkage differential between the molded feature and the neck portion, which could otherwise cause sealing problems with a closure as a result of deformation of the neck portion. A method of correcting a sealing problem in a plastic container by reducing the volume of the molded feature is also disclosed.

13 Claims, 7 Drawing Sheets

MOLDED PLASTIC CONTAINER WITH REDUCED NECK OVALITY

BACKGROUND OF THE INVENTION

1. Field of the Invention

This invention relates generally to the field of packaging, and more specifically to molded plastic containers of the type that have neck or finish portion that is constructed and arranged to form a seal with respect to a closure.

2. Description of the Related Technology

Plastic containers are typically fabricated using either injection molding or one of two types of blow molding. The blow molding process is characterized by using internal pressure to force a hot, soft plastic preform or parison against a molding surface. Blow molding can be performed using either a reheat stretch blow molding process, which is typical for plastic containers that are fabricated from polyethylene terephthalate (PET), or an extrusion blow molding process, which is typical for containers that are fabricated from such materials as high-density polyethylene and polyolefins.

In the extrusion blow molding process, a molten tube or parison is continuously extruded from an extrusion fixture. A mold assembly that moves at a speed that is substantially equal to the speed of the extruded parison periodically captures portions of the parison, and pressurization as applied to inflate the captured portion of the parison against the interior surfaces of the mold assembly. The mold assembly is typically mounted for motion on either a molding wheel, which moves in a circular path, or on a shuttle, which moves the mold assembly on a substantially straight path.

Plastic containers typically include a neck or finish portion having an opening that is in communication with the interior space of the container. In some instances, the neck or finish portion is threaded to permit application of a closure. In other cases, structure is molded into the neck or finish portion to permit a closure to be snapped on. The neck or finish portion typically includes at least one sealing surface that is adapted to bear against a portion of a closure in order to form a liquid tight seal with respect to the closure when it is properly applied.

As is shown in FIGS. 1 and 2, one type of conventional plastic container 10 includes a main body portion 12 and a neck portion 14. The neck portion 14 has an upper lip 16 that defines an opening and a sealing surface 18 that is constructed and arranged to form a seal with respect to an applied closure. A molded feature such as an anti-rotation lug 20 is provided adjacent to the neck portion. The anti-rotation lug 20 had a generally triangular shape when viewed in side elevation, with a first inclined side surface 24, a second inclined side surface 26 and a solid outer surface 22 facing away from the neck portion 14. It had a maximum width $W_1$, a maximum height $H_1$ and a maximum radial depth $D_1$. The anti-rotation lug 20 functioned to prevent or deter a closure from being unscrewed from the neck portion 14 by a consumer after it has been applied by the manufacturer. In the case of such containers, the anti-rotation lug 20 was integral with the neck portion 14 at a part of the neck portion 14 that was nearby the sealing surface 18.

Some of these containers 10 experienced a deformation condition known as ovalization, in which the neck or finish portion 14 deviated from its ideal substantially cylindrical shape. This created sealing problems with respect to an applied closure. The inventors herein have identified a cause of such ovalization as being uneven shrinkage of the neck or finish portion after the hot molded container is removed from the mold. It has been determined that the thermal mass of the anti-rotation lug was a significant factor in causing the uneven shrinkage.

A need exists for an improved molded plastic container having a neck or finish portion that is adjacent to a molded feature that is less susceptible to deformation as a result of uneven cooling after the container has been removed from the mold. A need also exists for a method of correcting a sealing problem in such a container that is caused at least in part by the presence of the molded feature.

SUMMARY OF THE INVENTION

Accordingly, it is an object of the invention to provide an improved molded plastic container having a neck or finish portion that is adjacent to a molded feature that is less susceptible to deformation as a result of uneven cooling after the container has been removed from the mold.

It is further an object of the invention to provide a method of correcting a sealing problem in such a container that is caused at least in part by the presence of the molded feature.

In order to achieve the above and other objects of the invention, a plastic container that is constructed according to a first aspect of the invention includes a main body portion having an inner surface that defines an interior space. The container further includes a neck portion having an opening that is in communication with the interior space. In addition, the container includes a molded feature that is adjacent to the neck portion. The molded feature has a space defined therein so that it occupies a volume that is less than a volume defined by the maximum external dimensions of the molded feature, whereby distortion of the neck portion as a result of differential cooling during the fabrication process is reduced.

A method of correcting a sealing problem in a plastic container having a main body portion defining an interior space, a neck portion defining an opening and having a sealing surface that is designed to seal with respect to a closure and a molded feature that is integral with the neck portion according to a second aspect of the invention includes steps of identifying a sealing problem that is created by differential shrinkage of the molded feature with respect to another portion of the container; and reducing the volume of the molded feature with respect to a volume that is defined by the maximum external dimensions of the molded feature.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 3:
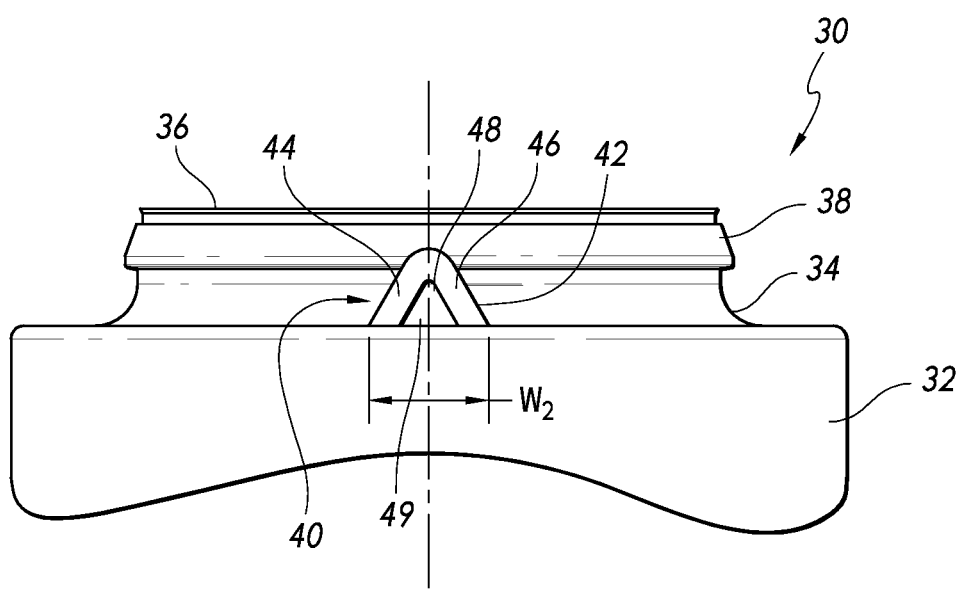
FIG. 3 is a fragmentary front elevational view of a portion of a plastic container that is constructed according to a first embodiment of the invention.

Referring now to the drawings, wherein like reference numerals designate corresponding structure throughout the views, and referring in particular to FIG. 3, a plastic container 30 according to a first embodiment of the invention includes a main body portion 32 that has an inner surface that defines an interior space and a neck portion 34 having an opening defined by an upper lip 36 that is in communication with the interior space. A sealing surface 38 is provided in the neck portion 34 for providing a seal with respect to a closure.

The plastic container 30 is preferably fabricated from a plastic material such as high-density polyethylene using an extrusion blow molding process. Alternatively, the plastic container 30 could be fabricated from a material such as polyethylene terephthalate (PET) using a reheat stretch blow molding process. As another possible alternative, plastic container 30 could be fabricated using injection molding.

Referring again to FIG. 3, it will be seen that plastic container 30 includes a molded feature 40 that is adjacent to the neck portion 34. In this embodiment, the molded feature 40 is an anti-rotation lug 42 that has a generally triangular shape when viewed in side elevation. The anti-rotation lug 42 includes a first side portion 44, a second side portion 46, with the first and second side portions 44, 46 being separated by an upper opening 48 that is embodied as a slot that extends substantially radially.

The anti-rotation lug 42 preferably has a maximum width $W_2$, which is the maximum external dimension of the molded feature 40. It further has a maximum height $H_2$ and a maximum radial depth $D_2$.

Figure 4:
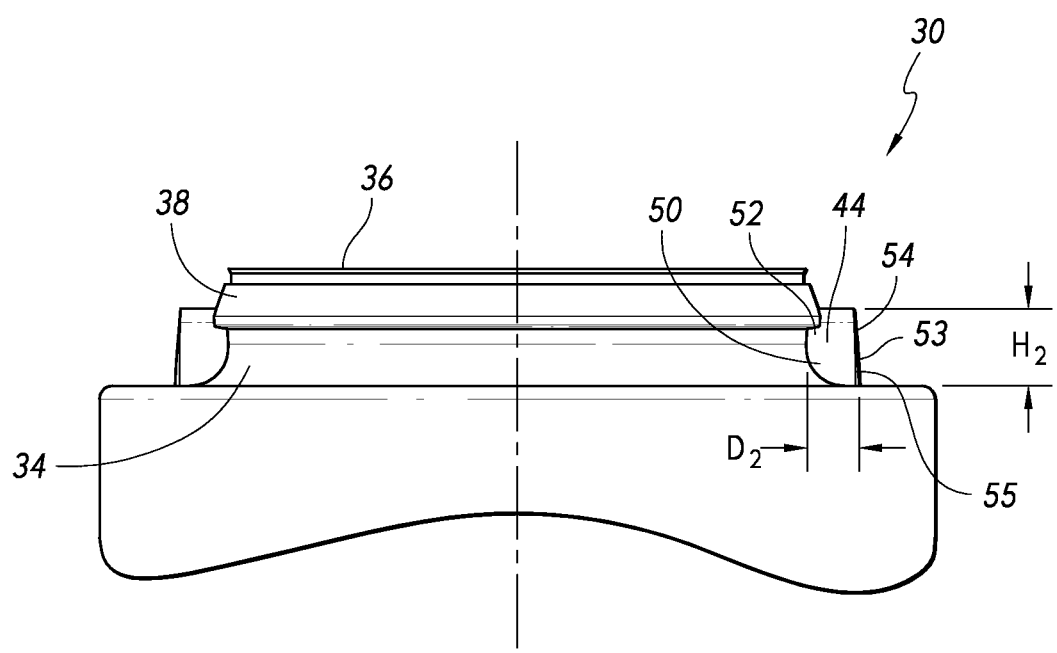
FIG. 4 is a fragmentary side elevational view of a portion of the plastic container that is shown in FIG. 3.

The anti-rotation lug 42 further preferably has a first portion 52, best shown in FIG. 4, which is integral with the neck portion 34 and a second portion 54 having an outer surface 55 that faces radially outwardly. A cavity 49 is defined within the anti-rotation lug 42. The cavity 49 is preferably defined in the outer surface 55 of the second portion 54.

Figure 1:
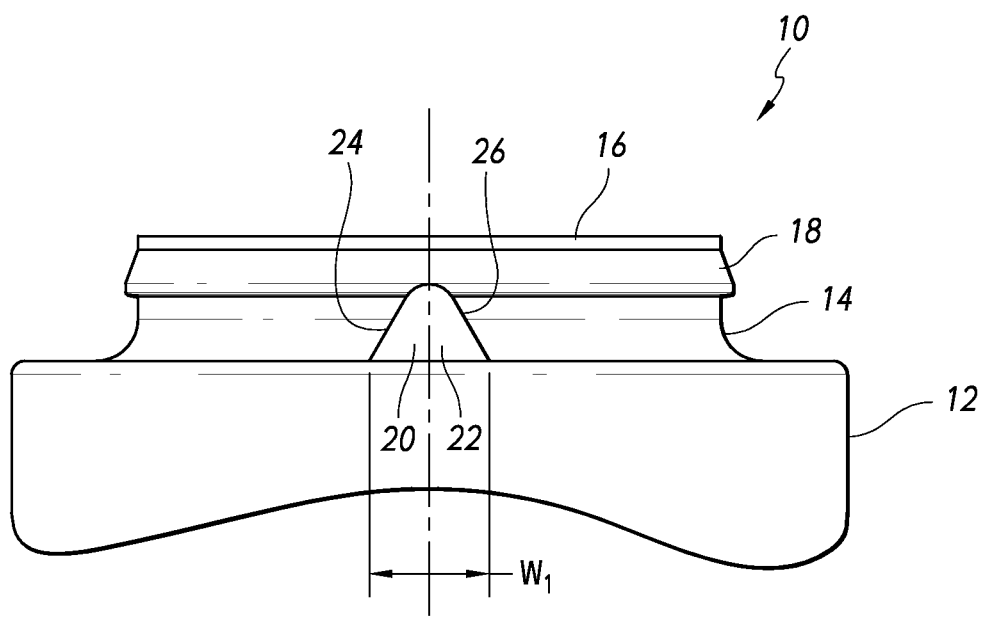
FIG. 1 is a fragmentary front elevational view of a portion of a conventional plastic container having a molded feature adjacent to a neck portion.
Figure 2:
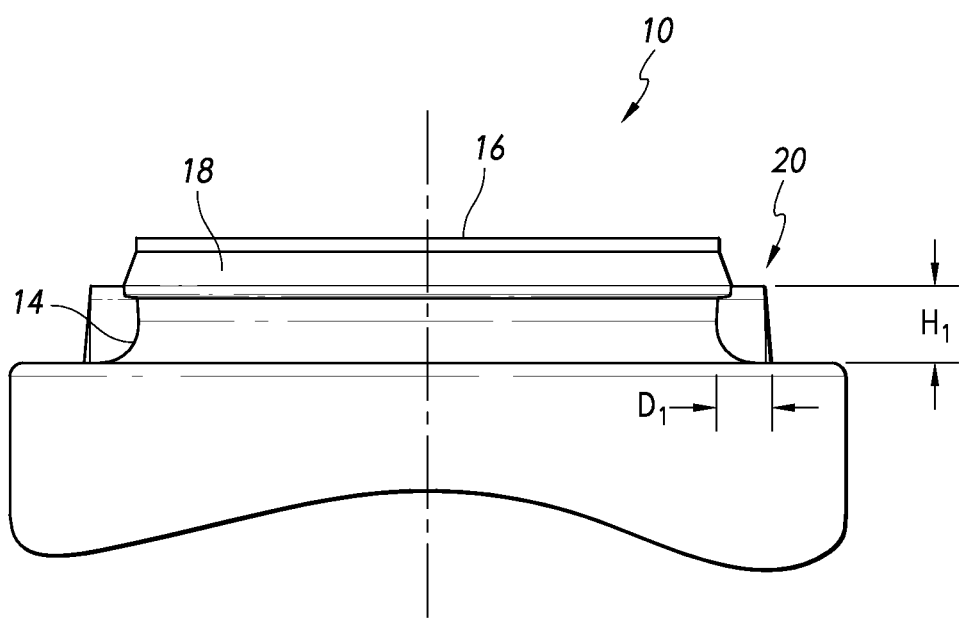
FIG. 2 is a fragmentary side elevational view of a portion of the conventional container that is shown in FIG. 1.

Because of the presence of the cavity 49 and the opening 48, the molded feature 40 occupies a volume that is less than a volume that would otherwise be defined by the maximum external dimensions of the molded feature 40. In addition, the surface area of the molded feature 40 is substantially increased relative to what it would have been in the event that the molded feature 40 was solid plastic, as was the molded feature in the conventional container that is described above with respect to FIGS. 1 and 2. As a result, the molded feature 40 will cool and shrink when removed from the mold at a rate that is more similar to adjacent structure, such as the neck portion 34, it would be the case if there were solid. Accordingly, distortion of the sealing surface 38 is minimized.

Figure 7:
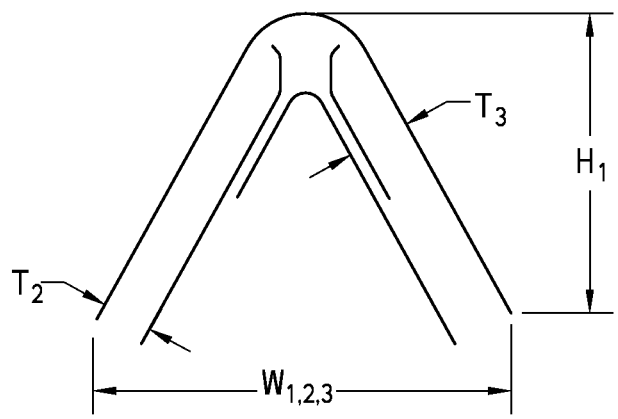
FIG. 7 is a diagrammatical depiction of the volumetric reduction that is accomplished in a molded feature in the different embodiments of the invention.

The anti-rotation lug 42 further preferably is shaped so as to have a maximum wall thickness $T_2$, best shown in FIG. 7, which is defined between the cavity 49 and the respective outer surfaces of the first and second side portions 44, 46.

Figure 5:
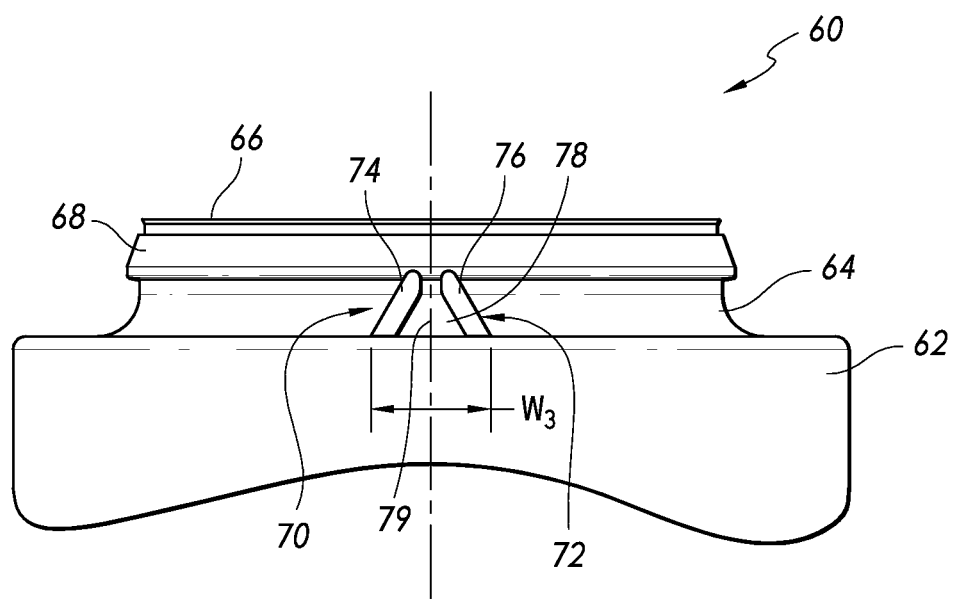
FIG. 5 is a fragmentary front elevational view of a portion of a plastic container that is constructed according to a second embodiment of the invention.
Figure 6:
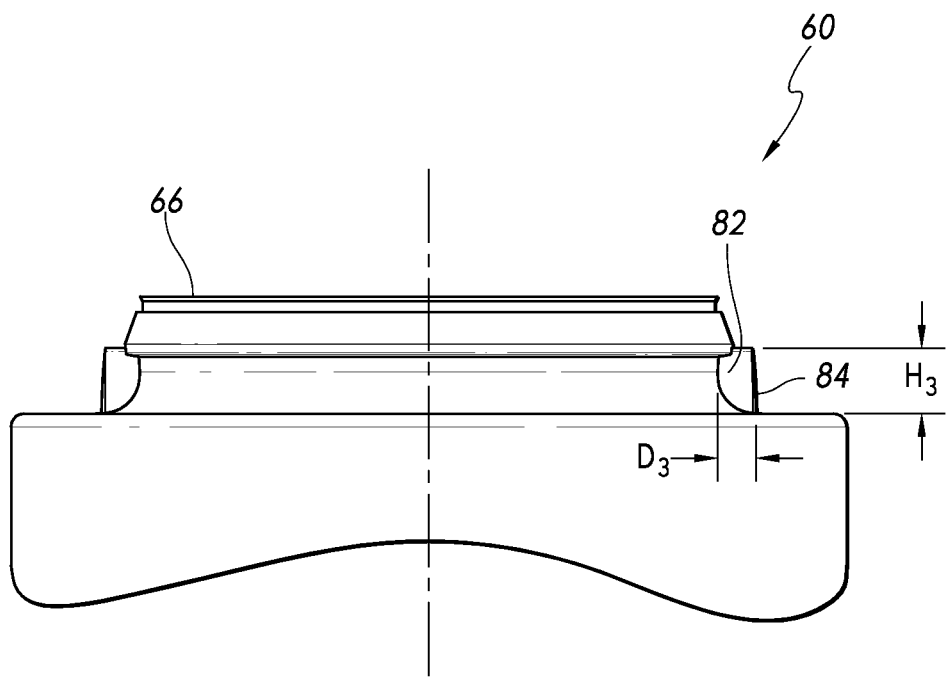
FIG. 6 is a fragmentary side elevational view of another portion of the plastic container that is shown in FIG. 5.

A plastic container 60 according to a second embodiment of the invention is depicted in FIGS. 5 and 6. It includes a main body portion 62 that has an inner surface that defines an interior space and a neck portion 64 having an opening defined by an upper lip 66 that is in communication with the interior space. A sealing surface 68 is provided in the neck portion 64 for providing a seal with respect to a closure.

The plastic container 60 is preferably fabricated from a plastic material such as high-density polyethylene using an extrusion blow molding process. Alternatively, the plastic container 60 could be fabricated from a material such as polyethylene terephthalate (PET) using a reheat stretch blow molding process. As another possible alternative, plastic container 30 could be fabricated using injection molding.

Referring again to FIG. 5, it will be seen that plastic container 60 includes a molded feature 70 that is adjacent to the neck portion 64. In this embodiment, the molded feature 70 is an anti-rotation lug 72 that has a generally triangular shape when viewed in side elevation. The anti-rotation lug 72 includes a first side portion 74, a second side portion 76, with the first and second side portions 74, 76 being separated by an upper opening 78 that is embodied as a slot that extends substantially radially. The first and second side portions 74, 76 are thinner than those in the first embodiment described above, and the opening 78 is larger.

The anti-rotation lug 72 preferably has a maximum width $W_3$, which is the maximum external dimension of the molded feature 40. It further has a maximum height $H_3$ and a maximum radial depth $D_3$.

The anti-rotation lug 72 further preferably has a first portion 82, best shown in FIG. 6, which is integral with the neck portion 64 and a second portion 84 having an outer surface 85 that faces radially outwardly. A cavity 79 is defined within the anti-rotation lug 72. The cavity 79 is preferably defined in the outer surface 85 of the second portion 84.

As a result of the presence of the cavity 79 and the opening 78, the molded feature 70 occupies a volume that is less than a volume that would otherwise be defined by the maximum external dimensions of the molded feature 70. In addition, the surface area of the molded feature 70 is substantially increased relative to what it would have been in the event that the molded feature 40 was solid plastic, as was the molded feature in the conventional container that is described above with respect to FIGS. 1 and 2. As a result, the molded feature 70 will cool and shrink when removed from the mold at a rate that is more similar to adjacent structure, such as the neck portion 64, it would be the case if there were solid. Accordingly, distortion of the sealing surface 68 is minimized.

The anti-rotation lug 72 further preferably is shaped so as to have a maximum wall thickness $T_3$, which is defined between the cavity 79 and the respective outer surfaces of the first and second side portions 74, 76.

Preferably, a ratio of the volume occupied by the molded features 40, 70 to the volume defined by the maximum external dimensions of the respective molded features 40, 70 is substantially within a range of about 0.1 to about 0.8, more preferably substantially within a range of about 0.2 to about 0.7, and most preferably substantially within a range of about 0.3 to about 0.6.

Preferably, a ratio of the maximum wall thickness $T_2$, $T_3$ to the maximum external dimension of the molded feature 40, 70 is substantially within a range of about 0.05 to about 0.45, more preferably substantially within a range of about 0.1 to about 0.35 and most preferably substantially within a range of about 0.2 to about 0.3.

The presence of the cavity 49, 79 and the opening 48, 78 also causes a substantial increase in external surface area of the anti-rotation lug 42 relative to what it would have been without those features. Preferably, this increase in surface area is substantially at least about 10%.

Figure 8:
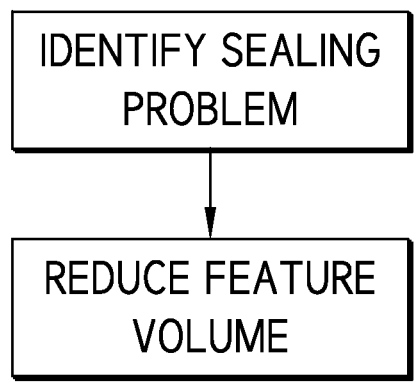
FIG. 8 is a flow chart depicting a method that is performed according to a preferred embodiment of the invention.

A preferred method of correcting a sealing problem in a plastic container of the type described above with respect to the two embodiments of the invention is shown diagrammatically in FIG. 8. It includes steps of identifying a sealing problem that is created by differential shrinkage of the molded feature with respect to another portion of the container, and reducing the volume of the molded feature with respect to a volume that is defined by the maximum external dimensions of the molded feature.

The step of reducing the volume of the molded feature is preferably performed by conducting a mold tooling change, and more specifically by revising the shape of the molded feature to include a cavity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A plastic container, comprising:
   a main body portion having an inner surface that defines an interior space;
   a neck portion having an opening that is in communication with the interior space; and
   a molded feature that is adjacent to the neck portion, the molded feature having a space defined therein so that the molded feature occupies a volume that is less than a volume defined by the maximum external dimensions of the molded feature, the molded feature having a first portion that is integral with the neck portion and a second portion with a cavity to define the space of the molded feature therein, wherein the molded feature has a generally triangular shape when viewed in side elevation and is configured to reduce distortion of the neck portion as a result of differential cooling during a fabrication process.

2. A plastic container according to claim 1, wherein a ratio of the volume occupied by the molded feature to the volume defined by the maximum external dimensions of the molded feature is substantially within a range of about 0.1 to about 0.8.

3. A plastic container according to claim 2, wherein the ratio is substantially within a range of about 0.2 to about 0.7.

4. A plastic container according to claim 3, wherein the ratio is substantially within a range of about 0.3 to about 0.6.

5. A plastic container according to claim 1, wherein the second portion of the molded feature is oriented so as to face substantially radially outwardly.

6. A plastic container according to claim 1, wherein the molded feature has a first side portion and a second side portion that is separated by an opening.

7. A plastic container according to claim 1, wherein the molded feature has a maximum wall thickness, and wherein a ratio of the maximum wall thickness to the maximum external dimension of the molded feature is substantially within a range of about 0.05 to about 0.45.

8. The plastic container according to claim 1, wherein the molded feature is an anti-rotation molded feature.

9. The plastic container according to claim 1, wherein the main body portion, the neck portion and the molded feature are fabricated using an extrusion blow molding process.

10. The plastic container according to claim 1, wherein the main body portion, the neck portion and the molded feature are fabricated from a material comprising high-density polyethylene.

11. The plastic container according to claim 1, wherein the neck portion includes a sealing surface that is constructed and arranged to form a seal with respect to a closure.

12. The plastic container according to claim 11, wherein the molded feature is integral with the neck portion adjacent to the sealing surface.

13. The plastic container according to claim 1, wherein the molded feature comprises an anti-rotation lug.

* * * * *